US007212374B1

(12) United States Patent
Wang et al.

(10) Patent No.: US 7,212,374 B1
(45) Date of Patent: May 1, 2007

(54) DISK DRIVE TO CHARACTERIZE MISALIGNED SERVO WEDGES

(75) Inventors: Zhi Wang, San Jose, CA (US); Jenghung Chen, Cupertino, CA (US); Chun Sei Tsai, Tustin, CA (US); Carl E. Barlow, Lake Forest, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/250,649

(22) Filed: Oct. 14, 2005

(51) Int. Cl.
*G11B 5/596* (2006.01)
*G11B 21/02* (2006.01)

(52) U.S. Cl. ................................ 360/78.14; 360/78.04

(58) Field of Classification Search .................... None
See application file for complete search history.

(56) References Cited

U.S. PATENT DOCUMENTS 6,021,012 A 2/2000 Bang
6,023,386 A * 2/2000 Reed et al. .................. 360/51
6,175,458 B1 1/2001 Carlson
6,710,957 B2 3/2004 Nakasato
6,839,194 B2 * 1/2005 Koyanagi .................... 360/51
7,075,746 B1 * 7/2006 Kupferman ............. 360/77.03

* cited by examiner

*Primary Examiner*—Andrea Wellington
*Assistant Examiner*—Jason Olson
(74) *Attorney, Agent, or Firm*—Blakely Sokoloff Taylor & Zafman

(57) ABSTRACT

Disclosed is a disk drive to characterize misaligned servo wedges. A disk of the disk drive includes a plurality of circumferential tracks, in which, each track includes a plurality of servo wedges spaced sequentially around the circumference of the track wherein the servo wedges may be misaligned relative to the head of the disk drive that moves about a pivot. A servo controller is used to characterize the misaligned servo wedges relative to the head during a seek operation by implementing the following operations: commanding the head to perform a seek operation from a starting track to an ending track; obtaining samples of wedge-to-wedge time (WTWT) values corresponding to time intervals between identified servo wedges for sampled tracks traversed during the seek operation; calculating WTWT variations for each sample; and calculating a calibrated misalignment value for each sample based upon WTWT variations.

25 Claims, 7 Drawing Sheets

600

| ID(i) 604 | ARC(i) 602 |
|---|---|
| 0 | 0 |
| 578 | X1 |
| 980 | X2 |
| 1134 | X3 |
| ... | ... |
| ID MAX CYL | Xn |

DISK DRIVE TO CHARACTERIZE MISALIGNED SERVO WEDGES

BACKGROUND OF THE INVENTION

1. Field of the Invention

The present invention relates to disk drives. More particularly, the present invention relates to a disk drive that characterizes misaligned servo wedges.

2. Description of the Prior Art and Related Information

Today, computing devices such as personal computers, personal digital assistants, cell-phones, etc., are routinely used at work, at home, and everywhere in-between. Computing devices advantageously enable the use of application specific software, file sharing, the creation of electronic documents, and electronic communication and commerce through the Internet and other computer networks. Typically, each computing device has a storage peripheral such as a disk drive.

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the moveable transducer head over a particular track on the disk to read or write information from and to that track, respectively.

Typically, a conventional hard disk drive includes a disk having a plurality of concentric tracks. Each surface of each disk conventionally contains a plurality of concentric data tracks angularly divided into a plurality of data sectors. In addition, special servo information may be provided on each disk to determine the position of the moveable transducer head.

The most popular form of servo is called "embedded servo" wherein the servo information is written in a plurality of servo wedges that are angularly spaced from one another and are interspersed between data sectors around each track of each disk.

Each servo wedge typically includes a phase lock loop (PLL) field, a servo synch mark (SSM) field, a track identification (TKID), a wedge ID field having a binary encoded wedge ID number to identify the wedge, and a group of servo bursts (e.g. an alternating pattern of magnetic transitions) which the servo control system of the disk drive samples to align the moveable transducer head with or relative to a particular track. Typically, the servo control system moves the transducer head toward a desired track during a course "seek" mode using the TKID field as a control input.

Once the moveable transducer head is generally over the desired track, the servo control system uses the servo bursts to keep the moveable transducer head over that track in a fine "track follow" mode. During track following mode, the moveable transducer head repeatedly reads the wedge ID field of each successive servo wedge to obtain the binary encoded wedge ID number that identifies each wedge of the track. In this way, the servo control system continuously knows where the moveable transducer head is relative to the disk.

In contemporary hard disk drives employing embedded servos, it is well known to provide framing of servo data via the servo synch mark (SSM) field. For example, in hard disk drives, a servo synchronization signal based on the moveable transducer head reading a servo synchronization mark (SSM) results in a read/write channel of the disk drive establishing a precise timing reference point for the reading of servo data and for read/write operations.

Today, disks, especially for small form factor (SFF) disk drives, are increasingly being servo-written by external media servo writers before being assembled into disk drives. During external media servo-writing, multiple disks are simultaneously servo-written to without having to be located in a disk drive. Typically, this occurs in a clean-room environment.

The external media servo writer typically controls a rotatable actuator assembly including actuator arms having one or more heads respectively attached to each actuator arm, in which the actuator assembly rotates about a pivot such that the heads are radially positioned over the disks, respectively, in order to write servo wedges onto the disk based upon a timing clock. Thus, servo wedges are written to disks based upon actuator arms and heads rotating about a pre-defined pivot.

Unfortunately, when the externally servo-written disks are later assembled into a disk drive, servo wedge misalignment often occurs due to the different mechanical characteristics of the actuator assemblies of the external servo writer and the disk drive. Particularly, the heads of the disk drive rotate about a different pivot than the heads that were used in the prior external media servo writing process.

Because of this, timing uncertainties are introduced into the servo control system thereby causing problems in seek operations. More particularly, due to this servo wedge misalignment, the servo control system may often be very inefficient in searching for and locking onto servo wedges resulting in long time delays, or in a worse case may never lock onto a servo wedge, resulting in the failure of the disk drive.

SUMMARY OF THE INVENTION

The present invention relates to disk drives. More particularly, the present invention relates to a disk drive that characterizes misaligned servo wedges.

In one embodiment of the present invention, a disk drive to characterize misaligned servo wedges comprises an actuator arm, a head, a disk, and a servo controller. The head is connected to a distal end of the actuator arm in which the actuator arm is rotatable about a pivot to move the head radially over the disk. The disk includes a plurality of circumferential tracks, in which, each track includes a plurality of servo wedges spaced sequentially around the circumference of the track for use in seeking and track following operations. The plurality of servo wedges may be misaligned relative to the head moving about the pivot. The servo controller is used to characterize the misaligned servo wedges relative to the head during a seek operation by implementing the following operations: commanding the head to perform a seek operation from a starting reference track to an ending reference track; obtaining samples of wedge-to-wedge time (WTWT) values corresponding to time intervals between identified servo wedges for sampled tracks traversed during the seek operation; calculating WTWT variations for each sample; and calculating a calibrated misalignment value for each sample based upon WTWT variations.

In another embodiment of the present invention, a method to characterize misaligned servo wedges in a disk drive is disclosed. The disk drive includes an actuator arm and a head connected to a distal end of the actuator arm, in which, the actuator arm is rotatable about a pivot to move the head radially over the disk. The disk includes a plurality of circumferential tracks, wherein each circumferential track includes a plurality of servo wedges spaced sequentially around the circumference of the track for use in seeking and track following operations. The servo wedges may be misaligned relative to the head moving about the pivot. The method to characterize the misaligned servo wedges comprises: commanding the head to perform a seek operation from a starting reference track to an ending reference track; obtaining samples of wedge-to-wedge time (WTWT) values corresponding to time intervals between identified servo wedges for sampled tracks traversed during the seek operation; calculating WTWT variations for each sample; and calculating a calibrated misalignment value for each sample based upon WTWT variations.

In yet another embodiment of the present invention, a disk drive to characterize misaligned servo wedges is disclosed. The disk drive includes an actuator arm and a head connected to a distal end of the actuator arm, in which, the actuator arm is rotatable about a pivot to move the head radially over the disk, and a disk having a plurality of circumferential tracks. Each circumferential track includes a plurality of servo wedges spaced sequentially around the circumference of the track for use in seeking and track follow operations, in which, the plurality of servo wedges may be misaligned relative to the head moving about a pivot. A processor-readable medium is also disclosed, the medium having stored thereon instructions, which when executed by the processor, cause the processor to perform the following operations to characterize misaligned servo wedges comprising: commanding the head to perform a seek operation from a starting reference track to an ending reference track; obtaining samples of wedge to wedge time (WTWT) values corresponding to time intervals between identified servo wedges for sampled tracks traversed during the seek operation; calculating WTWT variations for each sample; and calculating a calibrated misalignment value for each sample based upon WTWT variations.

The foregoing and other features of the invention are described in detail below and are set forth in the appended claims.

DETAILED DESCRIPTION

Figure 1:
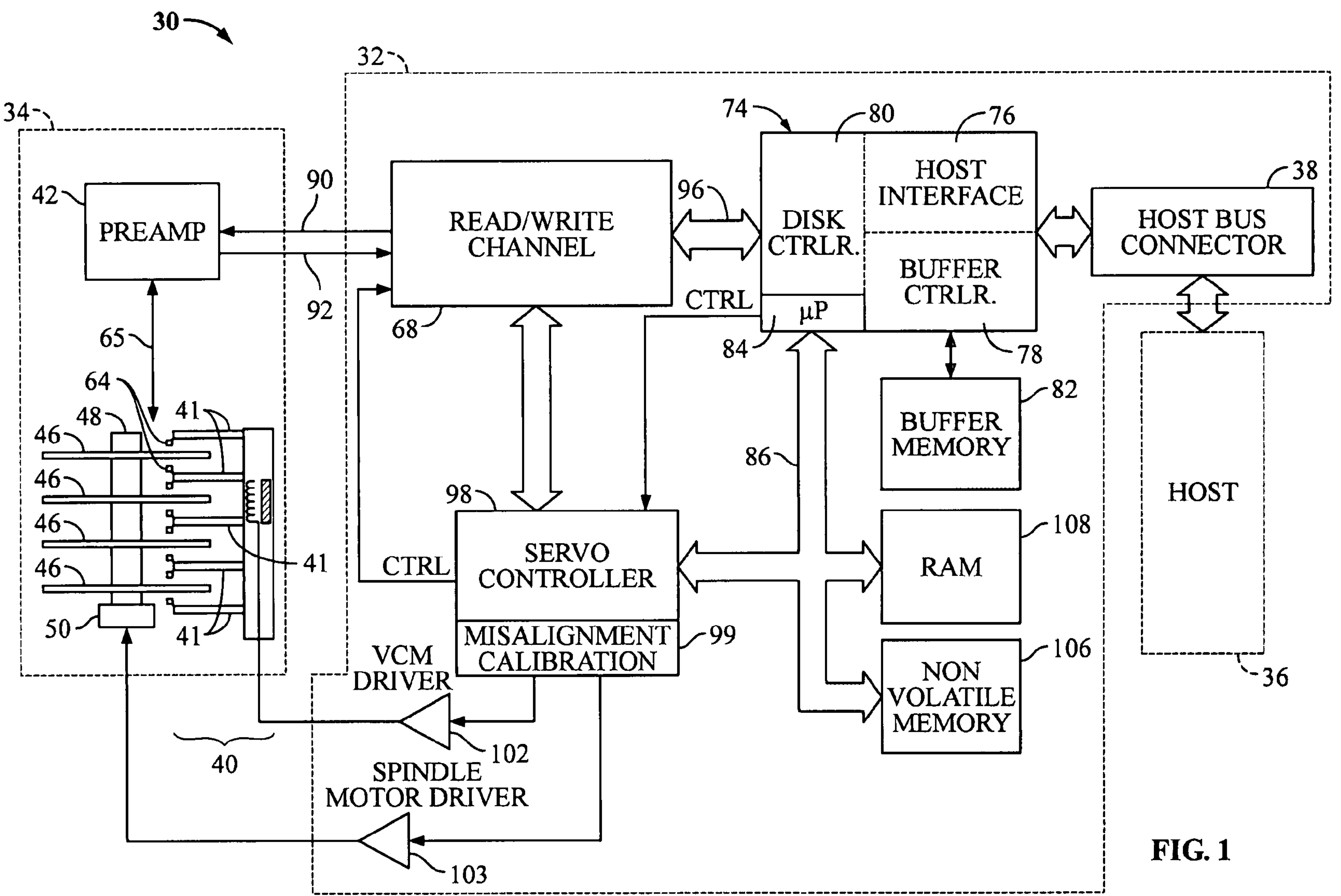
FIG. 1 shows a simplified block diagram of a disk drive, in which embodiments of the invention may be practiced.

FIG. 1 shows a simplified block diagram of disk drive 30, in which embodiments of the invention may be practiced. Disk drive 30 comprises a Head/Disk Assembly (HDA) 34 and a controller printed circuit board assembly (PCBA) 32. Host 36 may be a computing device 36 such as a desktop computer, a laptop computer, a mobile computing device (e.g. PDA, camera, cell-phone, etc.), or any type of computing device. Disk drive 30 may be of a suitable form factor and capacity for larger computers or for smaller mobile devices (e.g. a small form factor (SFF) disk drive).

The HDA 34 comprises: one or more disks 46 for data storage; a spindle motor 50 for rapidly spinning each disk 46 (four shown) on a spindle 48; and an actuator assembly 40 for moving a plurality of heads 64 in unison over each disk 46. Actuator assembly 40 includes a plurality of actuator arms 41 having heads 64 attached to distal ends thereof, respectively, such that the actuator arms 41 and heads 64 are rotated about a pivot point so that the heads sweep radially across the disks 46, respectively. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface and disk controller (HIDC) 74, voice coil motor driver (VCM) 102, spindle motor driver (SMD) 103, microprocessor 84, and several memory arrays—buffer or cache memory 82, RAM 108, and non-volatile memory 106.

Servo controller 98 may operate under the control of a program or routine, including a servo wedge misalignment calibration program 99, to execute methods or processes in accordance with embodiments of the invention, as will be described later. These embodiments relate to characterizing servo wedges that are misaligned with respect to the rotation of the actuator assembly 40 and compensating for this misalignment. Further, microprocessor 84 may pre-program servo controller 98 and/or initialize the servo controller with initial and operational values for use in implementing the misalignment calibration methodology and to aid in compensating for the misaligned servo wedges.

Host initiated operations for reading and writing data in disk drive 30 are executed under control of microprocessor 84 connected to the controllers and memory arrays via a bus 86. Program code executed by microprocessor 84 is stored in non-volatile memory 106 and random access memory RAM 108. Program overlay code stored on reserved tracks of disks 46 may also be loaded into RAM 108 as required for execution.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Preferably, channel 68 employs PRML (partial response maximum likelihood) coding techniques, although the invention may be practiced with equal advantage using other coding processes.

HIDC 74 comprises a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

The servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103.

In one embodiment, disk drive 30 employs a sampled servo system in which equally spaced servo wedge sectors (termed "servo wedges") are recorded on each track of each disk 46. Data sectors are recorded in the intervals between servo sectors on each track. Servo sectors are sampled at regular intervals by servo controller 98 to provide servo position information to microprocessor 84. Servo sectors are received by channel 68, and are processed by servo controller 98 to provide position information to microprocessor 84 via bus 86. Further, servo controller 98 may operate under the control of a program or routine, such as a servo wedge misalignment calibration program 99 to execute methods or processes in accordance with embodiments of the invention related to characterizing servo wedges that are misaligned with respect to the rotation of the actuator assembly 40 and compensating for this misalignment, as will be discussed.

Figure 2:
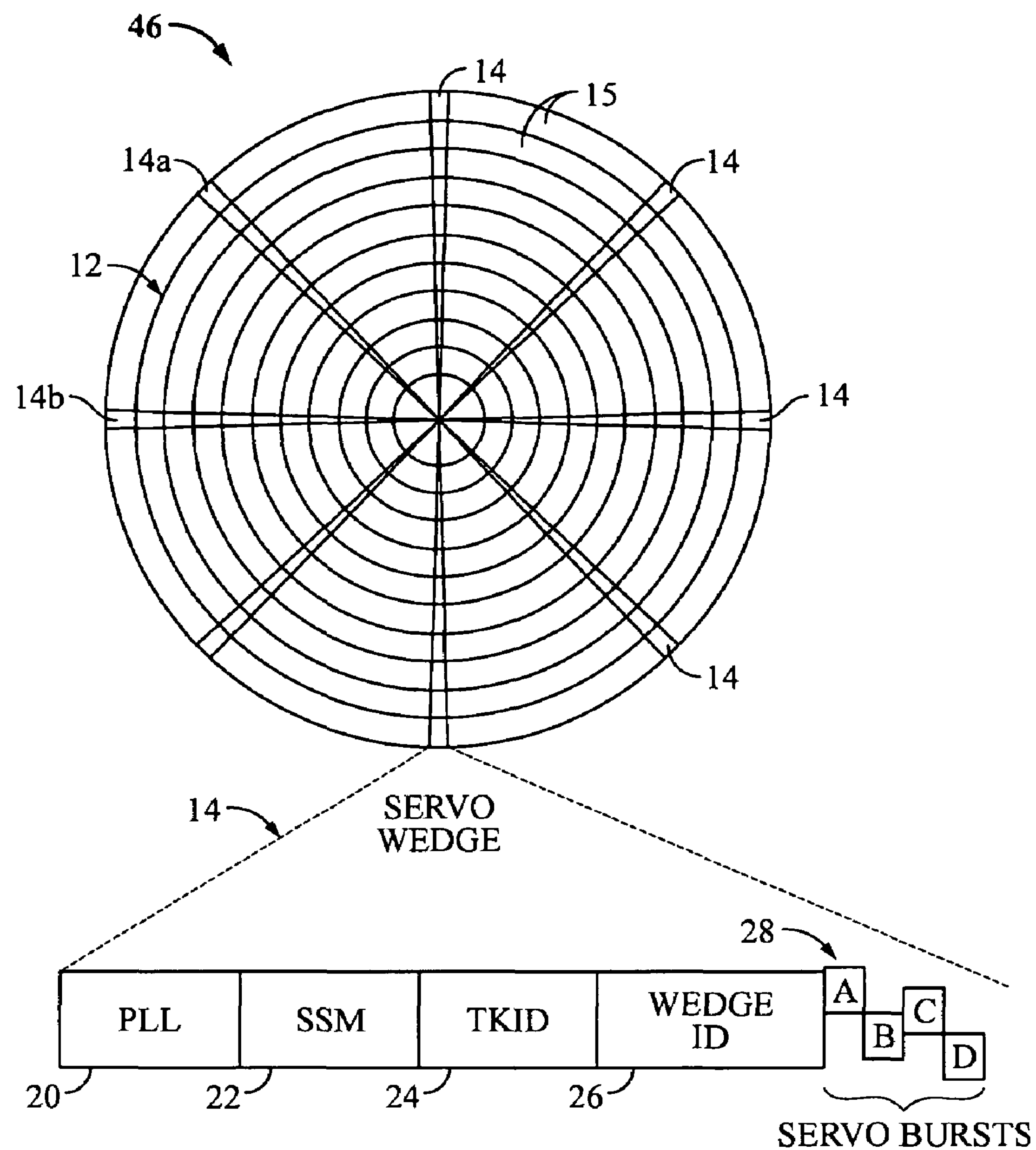
FIG. 2 shows a disk of the disk drive of FIG. 1 having a plurality of concentric tracks, and more particularly, illustrates components of a servo wedge.

With reference also to FIG. 2, FIG. 2 shows a disk 46 of the disk drive 30 of FIG. 1 having a plurality of concentric tracks, and more particularly, illustrates components of a servo wedge 14. Disk 46 includes a plurality of concentric circumferential tracks 12. Each circumferential track 12 includes a plurality of embedded servo wedges 14 utilized in seeking and track following. The pluralities of servo wedges 14 are spaced sequentially around a circumference of the circumferential track 12. For example, embedded servo wedges 14*a*, 14*b*, etc., contain servo information utilized in seeking and track following and are interspersed between data regions 15 of the disk 46. Data is conventionally written in the data regions 15 in a plurality of discrete data sectors. Each data region 15 is typically preceded by a servo wedge 14.

Each servo wedge 14 includes phase lock loop (PLL) field 20, a servo synch mark (SSM) field 22, a track identification (TKID) field 24, a wedge identifier (ID) 26, and a group of servo bursts (e.g. ABCD) 28 (e.g. an alternating pattern of magnetic transitions) that the servo control system samples to align the moveable transducer head with, and relative to, a particular track. Typically, the servo controller 98 moves the transducer head 64 toward a desired track during a coarse "seek" mode using the TKID field 24 as a control input.

However, in processing information, it is necessary to ensure consistency in the detection of bits composing a block of bits. In order to ensure such consistency, the phase lock loop (PLL) field 20 is first read in order to facilitate bit synchronization. Next, the servo synch mark 22 is read to facilitate block synchronization. The SSM 22 facilitates block synchronization by acting as a special marker that is detected to "frame" data, i.e., to identify a boundary of a block. A valid servo synchronization signal results in the read/write channel 68 of the disk drive 30 establishing a precise timing reference point for the reading of servo data and for read/write operations. It is well known to provide framing of servo data via a SSM 22. The wedge ID 26 is a binary encoded wedge ID number to identify the wedge.

Further, once the transducer head 64 is generally over a desired track 12, the servo controller 98 uses the servo bursts (e.g. ABCD) 28 to keep the transducer head 64 over the track in a fine "track follow" mode. During track following mode, the moveable transducer head 64 repeatedly reads the wedge ID 26 of each successive servo wedge to obtain the binary encoded wedge ID number that identifies each wedge of the track.

Based on the TKID and wedge ID, the servo controller 98 continuously knows where the head 64 is relative to the disk 46 and communicates this to microprocessor 84. In this way, the microprocessor 84 continuously knows where the head 64 is relative to the disk and can command the movement of the head 64, via the servo control system, to implement disk drive operations, suck as seeking, tracking, read/write operations, etc.

Figure 3:
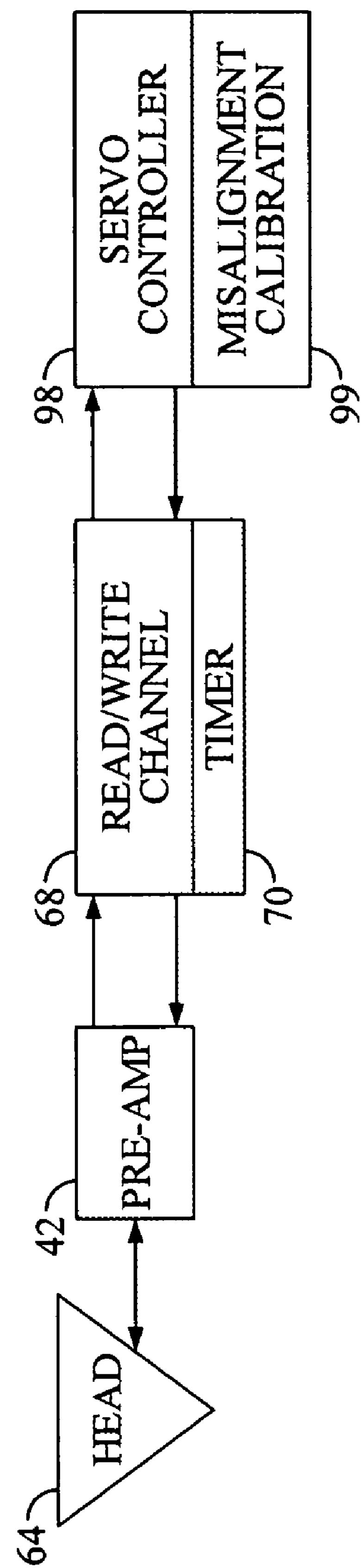
FIG. 3 shows a simplified block diagram of some of the components of the disk drive of FIG. 1, which are relevant to the description of the implementation of a servo control system, according to one embodiment of the present invention.

Turning now to FIG. 3, FIG. 3 illustrates a simplified example of some of the components of the previously described disk drive 30 that are relevant to the description of the implementation of the disk drive servo controller 98. As previously discussed, the servo controller 98 samples servo wedges at regular intervals to provide servo position information. Servo wedges are read by head 64, amplified by pre-amplifier 42, are received by read/write channel 68, and are processed by servo controller 98. Read/write channel may also include a timer 70.

Servo controller 98 may operate under the control of a program or routine, such as a servo wedge misalignment calibration program to execute methods or processes in accordance with embodiments of the invention. Embodiments of the invention relate to implementing a misalignment calibration method to characterize servo wedges that are misaligned with respect to the rotation of the head 64 of the actuator assembly 40 and to compensate for this misalignment. As previously discussed, the servo controller 98 is generally responsible for commanding seeking and track following operations via actuator assembly 40 and moveable head 64.

Is should be appreciated that embodiments of the invention may be implemented with servo controller and/or other circuitry, including microprocessor 84. Particularly, circuitry of the disk drive, including but not limited to servo controller 98 and/or microprocessor 84, may operate under the control of a program or routine to execute methods or processes in accordance with embodiments of the invention related to characterizing servo wedges that are misaligned with respect to the rotation of the head 64 of the actuator assembly 40 and to compensate for this misalignment. For example, such a program may be implemented in firmware or software (e.g. stored in non-volatile memory 106 or other locations) and may be implemented by processors such as: servo controller 98, microprocessor 84, and/or other circuitry.

Components of the various embodiments of the invention may be implemented as hardware, software, firmware, microcode, or any combination thereof. When implemented in software, firmware, or microcode, the elements of the embodiment of the present invention are the program code or code segments that include instructions to perform the necessary tasks. A code segment may represent a procedure, a function, a subprogram, a program, a routine, a subroutine, a module, a software package, a class, or any combination of instructions, data structures, or program statements.

The program or code segments may be stored in a processor readable medium or transmitted by a data signal embodied in a carrier wave, or a signal modulated by a carrier, over a transmission medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

Figure 4:
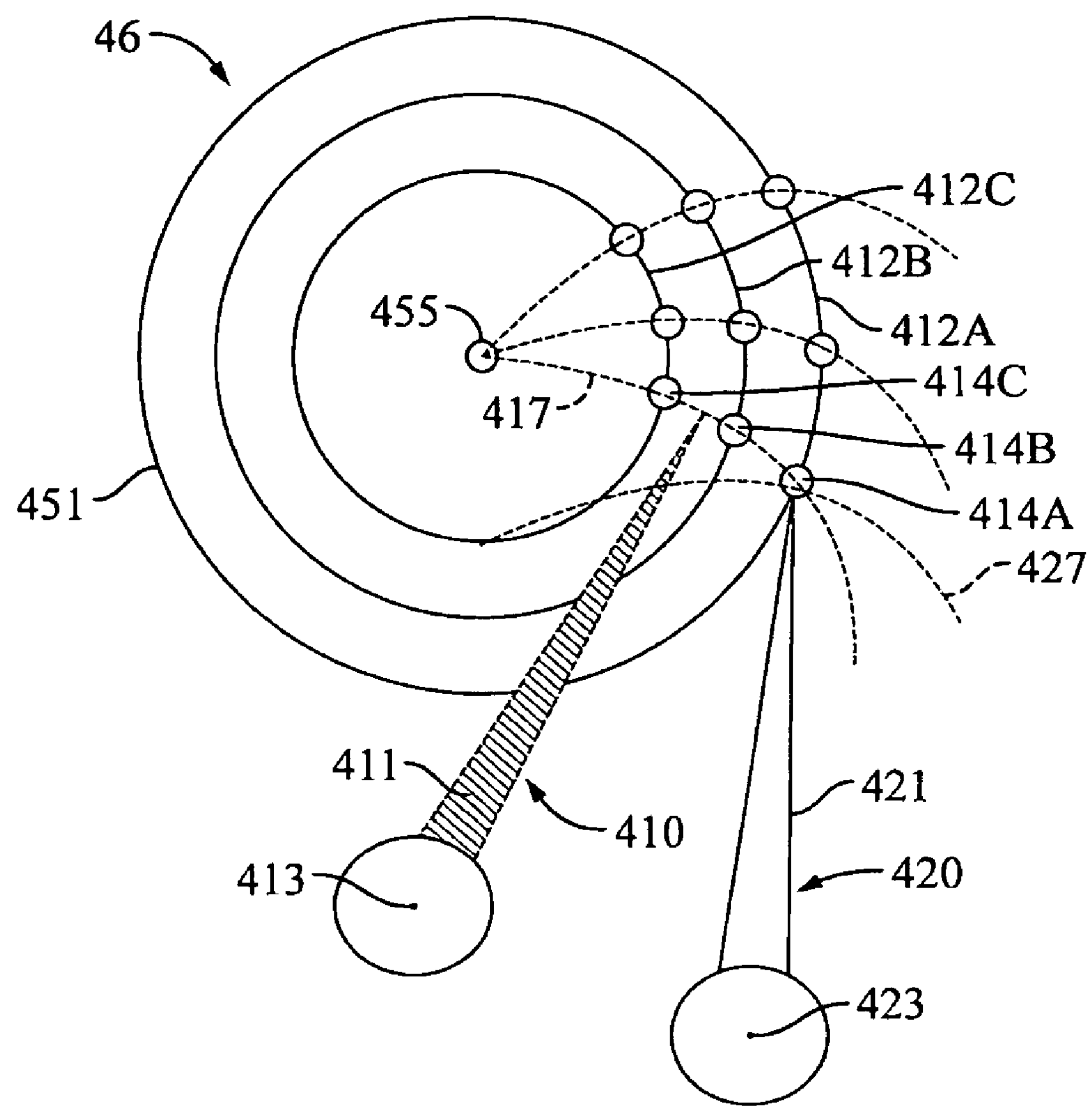
FIG. 4 is a diagram illustrating servo wedges previously servo-written to a disk and their relationship to an actuator assembly of a disk drive in which the disk is mounted.

Turning now to FIG. 4, FIG. 4 is a diagram illustrating servo wedges 414 servo-written to disk 46 by a first actuator assembly 410 and their relationship to actuator assembly 420 of the disk drive in which the disk is mounted.

As illustrated in FIG. 4, disk 46 has been servo-written with servo wedges (e.g. 414A, 414B, 414C) by a first rotatable actuator assembly 410 that includes an actuator arm 411 having a head attached to the end of the actuator arm. The actuator assembly 410 rotates about a first pivot 413 such that the head is radially positioned over disk 46 in order to write servo wedges to the disk, as part of, for example, an external servo writer.

An example of this servo-writing process may be exemplified by an external media servo writer that writes servo wedges to a disk outside of the disk drive in a clean-room environment based upon a very accurate timing clock. In this example servo wedges 414A, 414B, 414C, etc., have been written to disk 46 based upon a head rotating about predefined pivot 413. Thus, each set of radially spaced servo wedges 414A, 414B, 414C, etc., are spaced along an arc 417 based upon the rotation of the head about pre-defined pivot 413.

However, when the externally servo-written disk 46 is later assembled into disk drive 30, servo wedge misalignment may occur due to the different mechanical characteristics of the actuator assembly 420 of the disk drive 30 and the actuator assembly 410 used by the external servo writer. Particularly, as shown in FIG. 4, actuator assembly 420 of disk drive 30 rotates about disk drive pivot 423 about which actuator arm 421 and the head of the disk drive rotate.

More particularly, the head of actuator assembly 420 of disk drive 30 rotates about disk drive pivot 423, which is a significantly different pivot point than that used by the actuator assembly 410 (i.e. pivot point 413) of the prior external media servo writer. Accordingly, the head of disk drive 30 sweeps across disk 46 with a different arc, arc 427, which is significantly different than the arc 417, with which the servo wedges 414 were written to disk 46 by the external media servo writer.

Thus, as can be clearly seen in FIG. 4, there is a great deal of servo wedge misalignment between the original servo wedges 414A, 414B, 414C, etc., written by the external media servo writer, and the arc by which actuator assembly 420 of the disk drive rotates about pivot point 423 to perform seek operations—based upon servo wedges read by servo controller 98.

In one embodiment, servo controller 98 operating under the control of a servo wedge misalignment calibration program 99 may characterize the servo wedges 414A, 414B, 414C, etc., that are misaligned with respect to the rotation of the head of actuator assembly 420 of the disk drive, and servo controller 98 compensates for this misalignment.

More particularly, servo controller 98 may characterize the misaligned servo wedges 414 during a seek operation by implementing the following operations: commanding the head of the actuator assembly 420 to perform a seek operation from a starting reference track to an ending reference track and obtaining samples of wedge-to-wedge time (WTWT) values corresponding to time intervals between identified servo wedges 414 of sampled tracks traversed during the seek operation. Further, WTWT variations for each sample can be calculated and a calibrated misalignment value for each sample based upon WTWT variations may be calculated.

In one embodiment, the seek operation of the actuator assembly 420 may be a full-stroke seek operation in which the starting reference track is the outer diameter track 451 and the ending reference track is the inner diameter track 455. Alternatively, the starting reference track may be the inner diameter track 455 and the ending reference track may be the outer diameter track 451. It should be appreciated that disk 46 and the actuator assemblies shown relative thereto in FIG. 4 are not drawn to scale.

The full-stroke seek operation may be performed at a relatively low coasting velocity to obtain these values. Further, as previously discussed, each servo wedge includes a servo synch mark (SSM) 22 and the WTWT values between servo wedges 414 are calculated based upon the time difference between servo controller 98 recognition of the SSMs of the servo wedges. The WTWT variation for each sample may include calculating the difference between the WTWT value for the sample and the nominal WTWT value for the disk drive. Further, a calibrated misalignment value with respect to the reference track may also be calculated.

The calibrated misalignment value for each sample and associated track identifiers may be stored in a look-up table and these values may be utilized by servo controller 98 such that when the servo controller 98 commands a seek between a first track and a second track, based upon the associated track identifiers and corresponding calibrated misalignment values, the servo controller 98 compensates for the misaligned servo wedges, as will be described in more detail later.

In one embodiment, the timer 70 of the read/write channel 68 may be utilized to calculate the time intervals for WTWT intervals and as a basis for variations thereof. Particularly, a feature referred to as disk synchronous write (DSW) may be utilized in calculating WTWT intervals and variations.

DSW may be utilized to learn timing errors between servo wedges (e.g. SSM to SSM) and position error signals (PESs), utilizing timer 70 of the read/write channel as a reference clock. Based upon these learned timing errors, the servo controller 98 may adapt the timing of the servo control signals (e.g. via frequency control) for use in the opening and closing of timing windows for the read/write channel 68 of the disk drive for use in disk drive operations. For example, DSW may be employed in the reading of servo data and in the reading and writing of user data. DSW may be employed by a servo controller 98 to follow speed variations of read servo data and position error signals (PESs), and may modify timing control signals of the servo control system and of the read/write channel 68. Particularly, servo-gate timing windows may be modified in order to accurately lock-on to servo wedges during characterizing servo wedge misalignment and in subsequent seeking and tracking operations.

It should be noted that, if disk drive 30 is seeking from an outer diameter track 412A towards the inner diameter, due to the misalignment between arc 427 of the head of the actuator assembly 420 of the disk drive and arc 417 of the servo-written servo wedges, WTWT is generally longer and the amount of time it takes servo controller 98 to recognize a servo wedge may take much longer than expected. Thus, time delays and inefficiencies are introduced into servo control operations. On the other hand, WTWT is generally shorter as the actuator assembly 420 of the disk drive moves from the inner diameter towards the outer diameter, which also results in problems in servo control.

Figure 5:
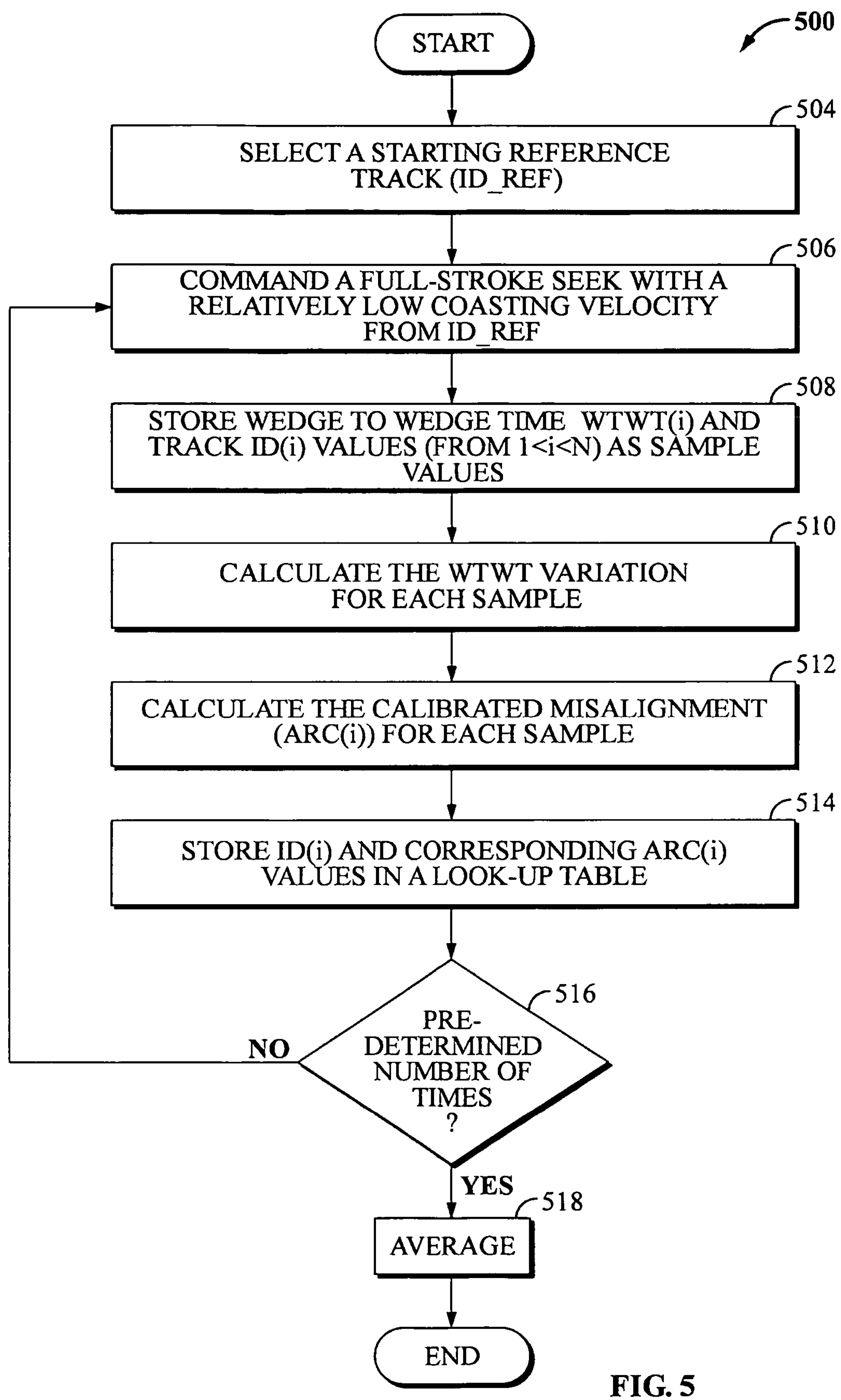
FIG. 5 is a flow chart illustrating a process to characterize misaligned servo wedges, according to one embodiment of the present invention.

With reference now to FIG. 5, FIG. 5 is a flow chart illustrating a more detailed process 500 to characterize misaligned servo wedges, according to one embodiment of the present invention.

At block 504, a starting reference track (ID_REF) is selected. For example, track 412A at the outer diameter 451 may be selected as a suitable ID_REF track. Next, at block 506, the servo controller 98 commands a full-stroke seek with a relatively low coasting velocity from the starting reference track ID_REF. During the seek operation, servo controller 98 may determine wedge-to-wedge time (WTWT) values corresponding to time intervals between identified servo wedges 414 for sampled tracks 412 traversed during the seek operation.

As previously discussed, the timer 70 of the read/write channel 68 may be utilized in conjunction with the servo controller 98 to clock the time for WTWT intervals and WTWT variations. Further, the previously discussed DSW feature may also be utilized to calculate WTWT intervals and variations.

At block 508, these WTWT values and their corresponding track ID values are stored as sample values.

Example equations for these values are:

WTWT(i) and ID(i), $1<i<N$

In this example, 1 is the first sample in the seek operations, and N is the last sample. It should be appreciated that wedge-to-wedge time (WTWT) may be in time units derived from timer 70 of the read/write channel 68 that operates in conjunction with servo controller 98. WTWT(i) corresponds to the wedge-to-wedge time in the i-th sample.

Next, at block 510, WTWT variations are calculated for each sample. An example equation for calculating the WTWT variation for each sample may be governed by the equation:

$$WTWTV(i)=WTWT(i)-WTWT0,\ 1<I<N$$

In this example, WTWTV corresponds to the wedge-to-wedge time variation for the i-th sample. This is calculated as the WTWT(i) value with the nominal wedge-to-wedge time (WTWT0) subtracted therefrom. This nominal WTWT value for the disk drive is calculated in a pre-determined number of timer counts (e.g. based upon timer 70 of the read/write channel 68).

Then, at block 512, calibrated misalignment values are calculated for each sample based upon WTWT variations. An equation for this may be described for each sample as follows:

$$\text{Arc}(i)=\sum_{k=1}^{i} WTWTV(k)$$

Each Arc(i) value corresponds to a calibrated misalignment of WTWT variations from ID (i) to the ID_REF in time units of timer 70. Next, each ID(i) value and corresponding Arc(i) value are stored in look-up table (block 514).

At block 516 it is determined whether or not this process has been performed a pre-determined number of times, and if not, the process returns to block 506. However, if the process has been performed a pre-determined number of times, then the plurality of calibrated misalignment values Arc(i) are averaged at block 528. In this way, servo controller 98 may perform a plurality of seek operations to characterize the misaligned servo wedges based upon a plurality of calibrated misalignment values and the servo controller may then average the plurality of calibrated misalignment values to obtain more accurate results.

It should be noted that it has been determined experimentally that more accurate samples may be taken when a full-stroke seek operation is performed at a relatively low coasting velocity such as 9 inches-per-second (IPS) or 18 IPS. By utilizing lower coasting velocities, more accurate calibrated misalignment values Arc(i) may be calculated. Also, by using lower coasting velocities, it may be easier to maintain servo synchronization during the calibration process. Further, by performing a plurality of seek operations to obtain multiple calibrated misalignment values, Arc(i)s, these calibrated misalignment values can be averaged to minimize noise associated with spindle speed variation and other noises within the disk drive system.

The calibrated misalignment values Arc(i) and associated track identifiers ID(i) may be stored in a look-up table and these values may be utilized by servo controller 98 such that when the servo controller seeks between a first track and a second track, based upon the associated track identifiers and corresponding calibrated misalignment values, the servo controller 98 can compensate for the misaligned servo wedges.

It has been found that the calibrated misalignment values represent a time-shift, similar to a direct current (DC) offset, and thus create a predictable pattern that may be calibrated for. Particularly, the calibrated misalignment values are linear in nature.

Figure 6:
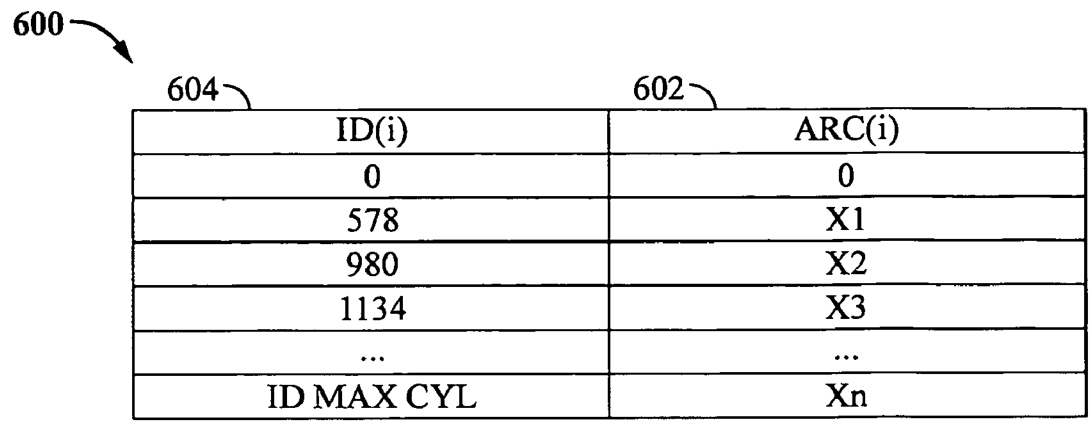
FIG. 6 is an example of a look-up table for storing calibrated misalignment values and associated track identifiers, according to one embodiment of the present invention.

Turning now to FIG. 6, FIG. 6 is an example of a look-up table 600 for storing calibrated misalignment values for each sample and associated track identifiers. As shown in FIG. 6, a plurality of calibrated misalignment values Arc(i) are shown in a first column 602 and associated track identifiers ID(i) are shown in a second column 604. These calibrated misalignment values and associated track identifiers may be calculated at the time of manufacture of the disk drive and stored in the look-up table 600. It should be appreciated that these calibrated misalignment values and associated track identifiers may be stored in a variety of formats and a look-up table is but one example.

During normal drive operation after calibration, correction values may be added to the nominal WTWT value (WTWT0) to adaptively control servo gate timing for subsequent servo wedges. This can be done each servo interrupt. By doing so, the effects of wedge misalignment can be removed and the servo controller 98 can utilize adaptive servo gate windows to detect servo wedges intelligently.

During the previously-described characterization process of servo wedge misalignment in which the servo controller 98 calculates the calibrated misalignment values Arc(i), the servo controller may utilize a disk synchronous write (DSW) feature in conjunction with timer 70 of the read/write channel 68 in order to learn timing errors between servo wedges (e.g. SSM to SSM) and position error signals (PESs). Based on those learned timing errors, servo controller 98 can adapt the timing of servo control signals (e.g. via frequency control) for use in the opening and closing of timing windows (e.g. servo gate timing windows) for the read/write channel of the disk drive for use in disk drive operations. The servo controller 98, based upon the calibrated misalignment samples for each track stored in the look-up table may then compensate for the servo wedge misalignment in seek operations.

Particularly, the calibrated misalignment value Arc(i) for each sample and associated track identifiers ID(i) may be stored in a look up table and these values may be utilized by the servo controller 98 such that when the servo controller 98 commands a seek operation between a first track and a second track, based upon the associated track identifiers and corresponding calibrated misalignment values, the servo controller 98 can compensate for the misaligned servo wedges.

Figure 7:
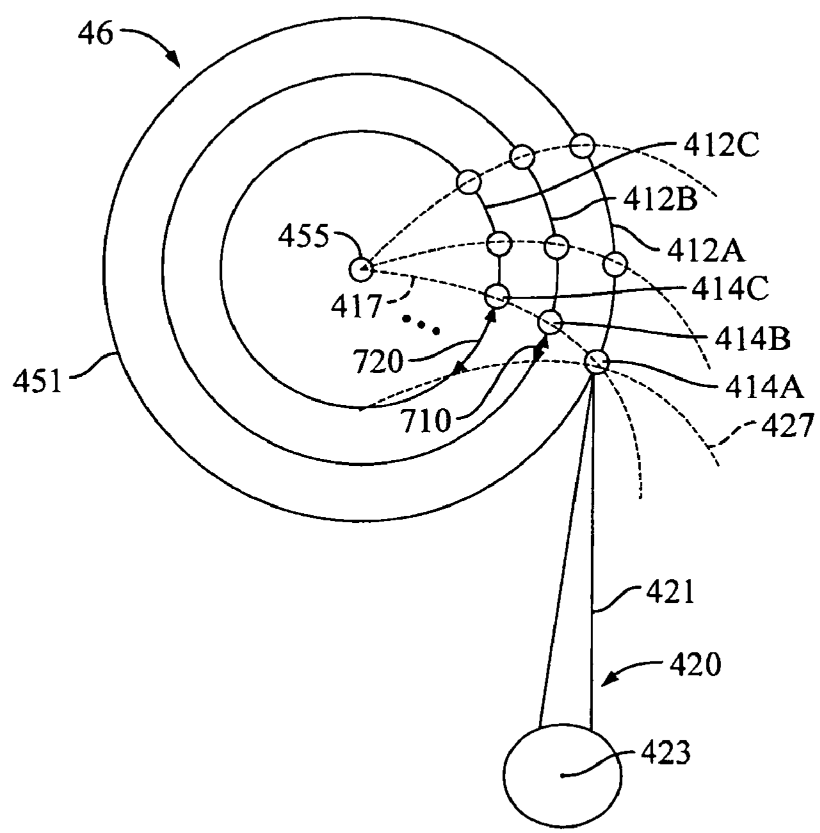
FIG. 7 is a diagram illustrating servo wedges previously servo-written to a disk and their relationship to an actuator assembly of a disk drive in which the disk is mounted, and, particularly illustrates how the trajectories upon which the servo wedges were previously servo-written are substantially different from the trajectory followed by the head of the actuator assembly of the disk drive.

As an example, with reference also to FIG. 7, assuming the head of the actuator arm 421 of the actuator 420 is currently on track 412A, servo controller 98 may command the head to seek to track 412C and to open a servo-gate window to find the next servo wedge. The servo controller may then utilize look-up table 600 and calculate the calibrated wedge misalignment value as X3−X1. It should be appreciated, however, that numerous tracks may not be covered in the look-up table and therefore interpolation may be utilized.

It can also be seen in FIG. 7 that the trajectories 417 upon which the servo wedges 414A, 414B, 414C, were previously servo-written may be substantially different from the trajectory 427 followed by the head of the actuator assembly 420 of the disk drive. In this example, the differences in these trajectories grow larger and larger as does the consequent servo wedge misalignment moving from the outer diameter 451 towards the inner diameter 455 as seen by arrow 710 and 720.

In any event, based upon the calibrated misalignment values (e.g. X3−X1) and associated track identifiers stored in the look-up table, these values may be utilized by the servo controller 98 such that when the servo controller seeks between a first track and a second track (e.g. 412A and 412C), the servo controller 98 may compensate for these misaligned servo wedges.

Figure 8:
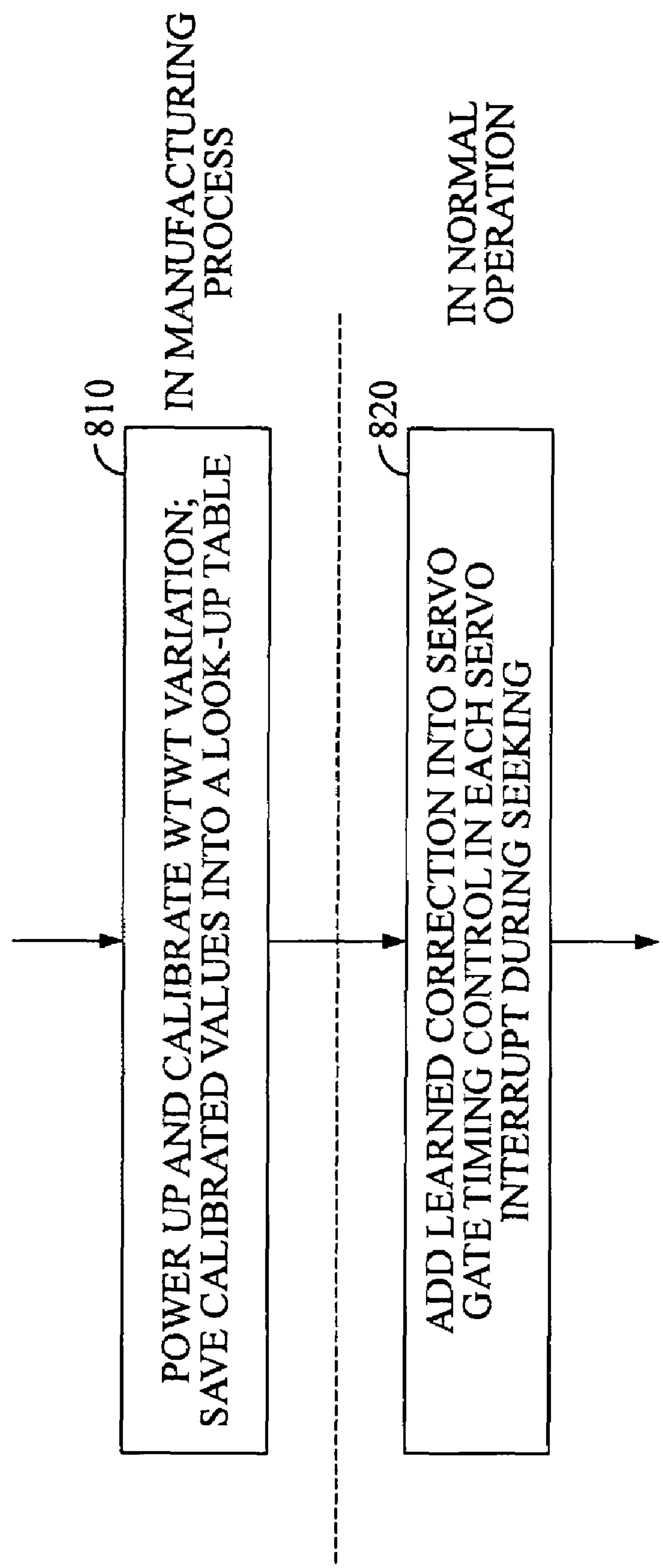
FIG. 8 is a flow diagram illustrating one example of a process of implementing the methodology to characterize misaligned servo wedges, according to one embodiment of the present invention.

Turning now to FIG. 8, FIG. 8 is a flow diagram illustrating one example of an implementation of the methodology to characterize misaligned servo wedges. In one embodiment, calibration may occur at block 810 in the manufacturing process after the disk is assembled into the disk drive. As shown in block 810, during the manufacturing process, the disk drive including a disk that already been servo-written to is powered up and the WTWT variations are calibrated, as previously discussed. These calibrated values are then saved into the look-up table. After manufacturing, during normal operations, as shown in block 820, the calibrated values may be utilized and known correction values can be added into servo gate timing control, during each servo gate interrupt, during seek operations, as previously discussed.

The methods described previously can be employed for disk drives with embedded servo systems. However, numerous alternatives for disk drives with similar or other media format characteristics can be employed by those skilled in the art to use the invention with equal advantage to implement these techniques. Further, although the embodiments have been described in the context of a disk drive with embedded servo sectors, the invention can be employed in many different types of disk drives having a head actuator that scans the media.

We claim:

1. A disk drive to characterize misaligned servo wedges, the disk drive comprising:
- an actuator arm;
- a head connected to a distal end of the actuator arm in which the actuator arm is rotatable about a pivot to move the head radially over the disk;
- a disk having a plurality of circumferential tracks, each circumferential track including a plurality of servo wedges spaced sequentially around a circumference of the track for use in seeking and track following operations, the plurality of servo wedges being misaligned relative to the head moving about the pivot; and
- a servo controller to characterize the misaligned servo wedges relative to the head during a seek operation by implementing the following operations:
  - commanding the head to perform a seek operation from a starting reference track to an ending reference track;
  - obtaining samples of wedge to wedge time (WTWT) values corresponding to time intervals between identified servo wedges for sampled tracks traversed during the seek operation;
  - calculating WTWT variations for each sample; and
  - calculating a calibrated misalignment value for each sample based upon WTWT variations.

2. The disk drive of claim 1, wherein the seek operation is a full-stroke seek operation in which the starting reference track is one of an inner or an outer diameter track and the ending reference track is one of the other of the inner or the outer diameter track.

3. The disk drive of claim 2, wherein the full-stroke seek operation is performed at a low coasting velocity.

4. The disk drive of claim 1, wherein each servo wedge includes a servo synch mark (SSM), and wherein WTWT values between servo wedges are calculated based upon the time difference of servo controller recognition of the SSMs of the servo wedges.

5. The disk drive of claim 1, wherein calculating a WTWT variation for a sample includes calculating the difference between the WTWT value for the sample and a nominal WTWT value for the disk drive.

6. The disk drive of claim 1, wherein the servo controller performs a plurality of seek operations to characterize the misaligned servo wedges based upon a plurality of calibrated misalignment values, the servo controller then averaging the plurality of calibrated misalignment values.

7. The disk drive of claim 1, further comprising a look-up table, wherein each calibrated misalignment value for each sample and an associated track identifier are stored in the look-up table.

8. The disk drive of claim 7, wherein the calibrated misalignment values and the associated track identifiers are stored in the look-up table during the manufacture of the disk drive.

9. The disk drive of claim 8, wherein upon subsequent seeks, the servo controller when seeking between a first track and a second track, based upon the associated track identifiers and corresponding calibrated misalignment values compensates for the misaligned servo wedges.

10. In a disk drive including an actuator arm and a head connected to a distal end of the actuator arm, the actuator arm being rotatable about a pivot to move the head radially over the disk, and a disk having a plurality of circumferential tracks, wherein each circumferential track includes a plurality of servo wedges spaced sequentially around a circumference of the track for use in seeking and track following operations, in which the plurality of servo wedges are misaligned relative to the head moving about the pivot, a method to characterize the misaligned servo wedges comprising:

commanding the head to perform a seek operation from a starting reference track to an ending reference track;

obtaining samples of wedge to wedge time (WTWT) values corresponding to time intervals between identified servo wedges for sampled tracks traversed during the seek operation;

calculating WTWT variations for each sample; and calculating a calibrated misalignment value for each sample based upon WTWT variations.

11. The method of claim 10, wherein the seek operation is a full-stroke seek operation in which the starting reference track is one of an inner or an outer diameter track and the ending reference track is one of the other of the inner or the outer diameter track.

12. The method of claim 11, wherein the full-stroke seek operation is performed at a low coasting velocity.

13. The method of claim 10, wherein calculating a WTWT variation for a sample includes calculating the difference between the WTWT value for the sample and a nominal WTWT value for the disk drive.

14. The method of claim 10, further comprising:

performing a plurality of seek operations to characterize the misaligned servo wedges based upon a plurality of calibrated misalignment values; and averaging the plurality of calibrated misalignment values.

15. The method of claim 10, further comprising:

associating each calibrated misalignment value for each sample with a track identifier; and storing each associated calibrated misalignment value and track identifier in a look-up table.

16. The method of claim 15, wherein the calibrated misalignment values and the associated track identifiers are stored in the look-up table during the manufacture of the disk drive.

17. The method of claim 16, wherein upon subsequent seeks, when seeking between a first track and a second track, further comprising compensating for the misaligned servo wedges based upon the associated track identifiers and corresponding calibrated misalignment values.

18. In a disk drive including an actuator arm and a head connected to a distal end of the actuator arm, the actuator arm being rotatable about a pivot to move the head radially over the disk, and a disk having a plurality of circumferential tracks, wherein each circumferential track includes a plurality of servo wedges spaced sequentially around a circumference of the track for use in seeking and track following operations, in which the plurality of servo wedges are misaligned relative to the head moving about the pivot, a processor-readable medium having stored thereon instructions, which when executed by a processor, cause the processor to perform the following operations to characterize the misaligned servo wedges comprising:

commanding the head to perform a seek operation from a starting reference track to an ending reference track;

obtaining samples of wedge to wedge time (WTWT) values corresponding to time intervals between identified servo wedges for sampled tracks traversed during the seek operation;

calculating WTWT variations for each sample; and calculating a calibrated misalignment value for each sample based upon WTWT variations.

19. The processor-readable medium of claim 18, further comprising instructions to perform the operation of commanding a full-stroke seek operation in which the starting reference track is one of an inner or an outer diameter track and the ending reference track is one of the other of the inner or the outer diameter track.

20. The processor-readable medium of claim 19, further comprising instructions to perform the operation of commanding the full-stroke seek operation to be performed at a low coasting velocity.

21. The processor-readable medium of claim 18, wherein calculating a WTWT variation for a sample includes calculating the difference between the WTWT value for the sample and a nominal WTWT value for the disk drive.

22. The processor-readable medium of claim 18, further comprising instructions to perform the operations of:

performing a plurality of seek operations to characterize the misaligned servo wedges based upon a plurality of calibrated misalignment values; and averaging the plurality of calibrated misalignment values.

23. The processor-readable medium of claim 18, further comprising instructions to perform the operations of:

associating each calibrated misalignment value for each sample with a track identifier; and storing each associated calibrated misalignment value and track identifier in a look-up table.

24. The processor-readable medium of claim 23, further comprising instructions to perform the operation of storing the calibrated misalignment values and the associated track identifier in a look-up table during the manufacture of the disk drive.

25. The processor-readable medium of claim 24, wherein upon subsequent seeks, when seeking between a first track and a second track, further comprising instructions to perform the operation of compensating for the misaligned servo wedges based upon the associated track identifiers and corresponding calibrated misalignment values.

* * * * *